Jan. 23, 1945.  W. R. TUTTLE  2,368,051
ELECTRIC HEATING UNIT
Filed Feb. 12, 1942
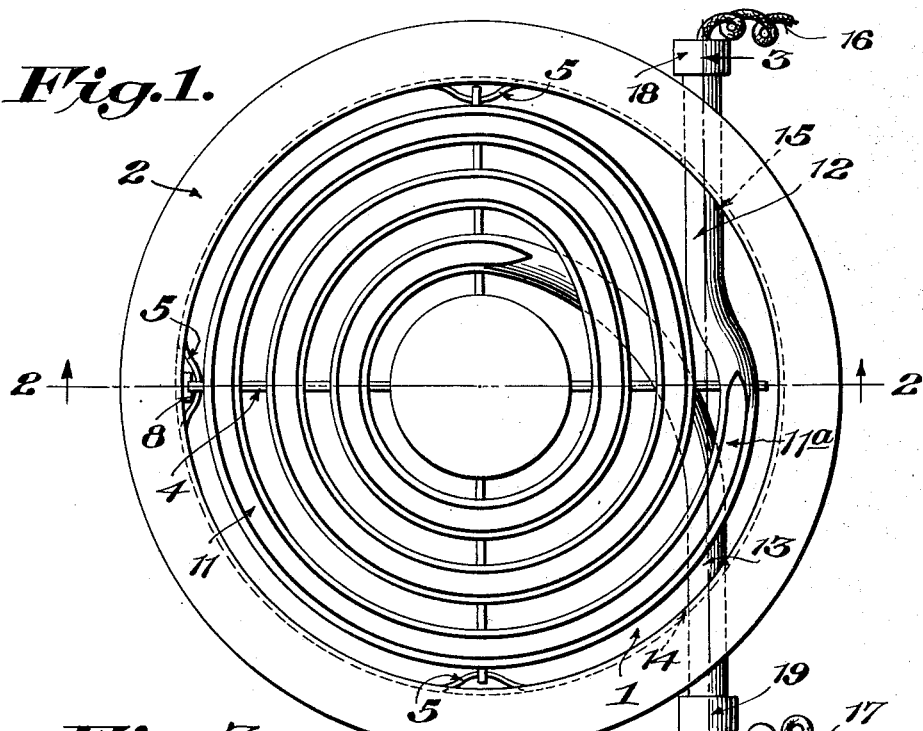
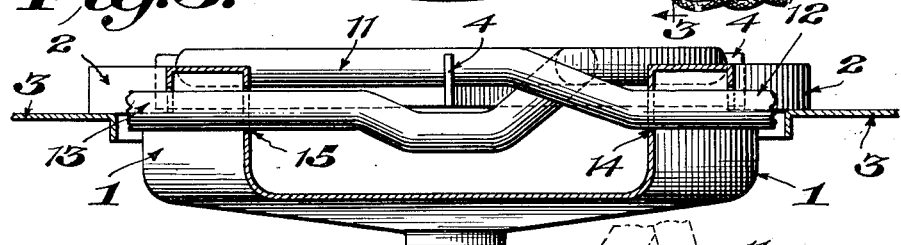
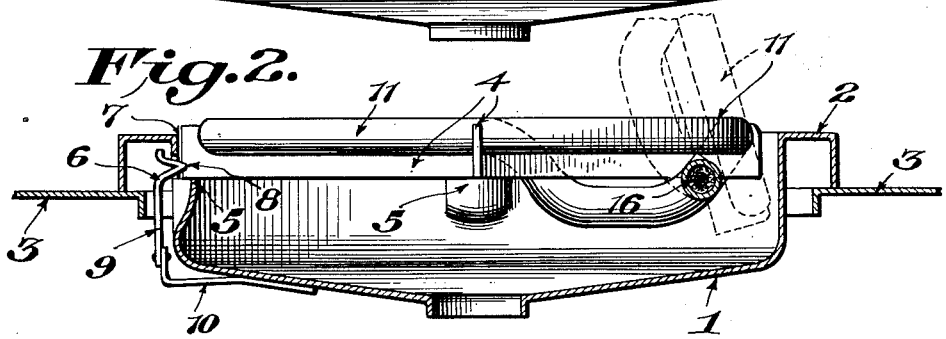
INVENTOR
William R. Tuttle,
BY Eugene M. Giles
ATTORNEY Patented Jan. 23, 1945

2,368,051

UNITED STATES PATENT OFFICE 2,368,051

ELECTRIC HEATING UNIT

William R. Tuttle, Riverside, Ill., assignor to Tuttle & Kift, Inc., Chicago, Ill., a corporation of Illinois Application February 12, 1942, Serial No. 430,684

7 Claims. (Cl. 219—37)

This invention relates to electric heating units such as are used in electric cooking stoves, chafing dishes and other electric heating devices. Such heating units commonly include a reflector pan to be supported within an opening in a stove top, and an electric heating element supported across the open top of the pan. In such an arrangement, the heating element obstructs access through the open top of the pan and into the interior thereof and, therefore, interferes with, if not actually prevents, the cleaning of the interior of the pan when it has become soiled by the accumulation of food spilled therein.

It is an important object of the present invention to provide for moving or shifting the heating element with respect to the pan until the heating element has cleared the open top of the pan and into a position where the open top of the pan is not obstructed by the heating element and access may be conveniently had to the interior of the pan for cleaning the same, while at the same time the underside of the heating element is exposed and may be readily cleaned.

A further object of the invention is to enable the desirable shifting of the heating element without disconnecting, disturbing, undesirably affecting, or placing any undue stresses or strains on the connection between the heating element and the electric conductor leads, and to reduce to the minimum the twisting of the flexible conductor leads by reason of the tilting movements of the heating element.

A still further object of the invention is to normally maintain the pan and heating element rigidly assembled so that there may be no independent movement and consequent rattling of the heating element when placing a cooking vessel on or removing the same from the heating element, while at the same time permitting convenient tilting of the heating element whenever desired.

The device of the present invention is complete in itself and may be originally installed in a stove or the like, or substituted for an old heating unit without requiring any change or alteration in the stove to which the present invention may be applied.

Other objects and advantages of the invention will appear hereinafter, and the invention consists in the combination and arrangement of parts as will be more fully described, illustrated in the accompanying drawing, and particularly pointed out in the appended claims, it being understood that changes in the form, proportion, size and minor details may be made, within the scope of the claims, without departing from the spirit or sacrificing any of the advantages of the invention.

In the drawing:

Fig. 1 is a top plan view of an electric heating unit or hot-plate embodying the features of the present invention.

Fig. 2 is a vertical sectional view on the line 2—2 of Fig. 1 with the heating element shown in dotted lines in an upwardly tilted position;

Fig. 3 is a fragmentary sectional view on the line 3—3 of Fig. 1.

The embodiment of the present invention, as shown in the accompanying drawing, includes a support member in the form of a more or less shallow pan 1, having an open top and provided with an outwardly and then downwardly directed marginal flange 2 at the top of the pan and intended to rest upon a stove top 3 adjacent the periphery of a so-called burner opening thereof, which is a convenient manner of mounting the supporting member upon a stove top so that the pan 1 is positioned within the burner opening.

Within the open top portion of the pan or supporting member 1 is a grid or spider 4, shown in Fig. 1 as embodying four radial arms, but it will, of course, be understood that the number of arms is not essential and may be varied according to the requirements of any particular form of heating element. This grid may be supported in any suitable manner within the pan 1. As shown in the accompanying drawing, the outer end of each grid arm 4 rests upon a shoulder 5 provided upon the inner face of the upstanding side wall of the pan and may be formed in any suitable manner. As indicated in Figs. 1 and 2, it will be seen that the shoulder 5 is formed by punching a portion of the side wall of the pan inwardly so that the top of the punched portion may form a supporting ledge or shoulder for the adjacent grid arm 4.

Suitable means is provided for holding the grid in place within the pan 1, such for instance as has been shown in Fig. 2 of the drawing, wherein 6 designates an upstanding spring latch member having its upper end within the bead flange 2 and extending through an opening 7 in the side wall of the pan 1 and into engagement with the outer end of the adjacent grid arm 4, the latter preferably being provided with a notch or seat 8 to receive the latch member 6. The shank 9 of the latch member extends downwardly and is connected to a bracket member 10 secured to the bottom of the pan 1.

As best shown in Fig. 1 of the drawing, it will be seen that the heating element shown in connection with the present embodiment of the invention includes a looped electric heating member in the form of a continuous coil 11, preferably flattened on its upper surface as indicated at 11a, which rests upon and is supported by the top of the grid support 4. Preferably, the convolutions of the coil rest in seats or notches in the grid bars 4 and the edges of the notches are slightly crimped around the coil to hold the same firmly seated, although any other assembly of the grid 4 and the coiled heating element 11 may be employed. However, the top surface of the heating element 11 should, of course, be disposed slightly above the top of the member 1 so that a cooking vessel may be supported directly upon the heating coil. It is understood that the heating element 11 is preferably in the form of a helical resistance element or wire imbedded in suitable insulating material, the whole being encased in a metallic sheathing.

The opposite terminal portions 12 and 13 of the coiled heating element are disposed substantially in axial alignment, in the same horizontal plane, and extend outwardly through openings 14 and 15 respectively, provided in the upstanding side wall of the pan 1. The terminal portions 12 and 13 are straight and constitute hinge pintles or journal means rotatably supported in the openings 14 and 15, whereby the heating element may be tilted or swung vertically on the axis defined by the parts 12 and 13 as indicated in dotted lines in Fig. 2 of the drawing. It will now be understood that the heating element 11, together with its supporting grid 4, may be tilted or swung upwardly on an axis which is substantially tangential to the circular heating element and into a position where the heating element does not obstruct the open top of the pan 1, thus giving free access through the open top of the pan for the purpose of removing spillings which may have become accumulated therein and for otherwise cleaning the interior of the pan. In the upwardly tilted portion of the heating element, the underside thereof is exposed and may be conveniently cleaned.

It will here be explained that the usual flexible electric conductor leads 16 and 17 are connected to the terminals of the resistance helix at the ends of the hinge pintle portions 12 and 13 of the heating element by known insulated connectors 18 and 19, in alignment with the axis on which the heating element is tiltably mounted. Therefore, there is no separation between the heating element and the conductor leads when moving the heating element into an upwardly tilted position. It will also be noted that the flexible conductor leads will merely turn axially with the hinge pintle portions 12 and 13, and, therefore, there will be no stresses or strains placed upon the mechanical and electrical connections between the conductor leads and the terminals of the resistance helix.

While we have described our invention in a preferred form, we are aware that various changes and modifications may be made without departing from the principles of our invention, the scope of which is to be determined by the appended claims.

What I claim is:

1. An electric heater unit, comprising an open top pan, a looped electric heating element disposed within the open top of the pan and supported upon shoulders provided within the pan, said heating element having opposite terminal portions disposed in longitudinal alignment and rotatably supported on the pan to permit tilting of the heating element thereon, and a latch carried by the pan for holding the heating element normally in position.

2. An electric heater unit comprising an open top pan having internal shoulders, a looped electric heating element within the top of the pan and supported upon the shoulder, said heating element having opposite terminal portions disposed in longitudinal alignment and rotatably supported on said pan to permit tilting of the heating element thereon, a grid underlying the looped heating element and resting upon the shoulders, and a latch carried externally by the pan and extending through an opening in the pan and into engagement with the grid to hold the latter and the heating element normally in place.

3. An electric heater unit comprising a coiled sheathed-resistor heater having horizontally, tangentially and oppositely disposed terminal portions, and an open-topped pan horizontally supporting said heater, said pan being provided with openings in its sides rotatably receiving said terminal portions as pintles for tilting the heater thereabout.

4. An electric heater unit comprising a coiled sheathed-resistor heater having horizontally, tangentially and oppositely disposed terminal portions, an open-topped pan horizontally supporting said heater, and means rotatably receiving said terminal portions for tilting the heater thereabout.

5. An electric heating element comprising a coiled sheathed-resistor heater, the convolutions thereof presenting a relatively flat horizontal supporting and heating surface, and bearing and journal means for rotatably supporting the element and comprising terminal portions thereof arranged horizontally and tangentially with respect to the coiled portion.

6. An electric heating element comprising a coiled sheathed-resistor heater the convolutions thereof presenting a relatively flat horizontal supporting and heating surface, and bearing and journal means for rotatably supporting the element and comprising terminal portions thereof oppositely directed and arranged horizontally and tangentially with respect to the coiled portion.

7. An electric heater unit comprising a coiled sheathed-resistor heater having horizontally, tangentially and oppositely disposed terminal portions, means for supporting said heater horizontally within a stove top opening, and means rotatably receiving said terminal portions for tilting the heater thereabout.

WILLIAM R. TUTTLE.